United States Patent [19]
Wang et al.

[11] Patent Number: 5,831,640
[45] Date of Patent: Nov. 3, 1998

[54] ENHANCED TEXTURE MAP DATA FETCHING CIRCUIT AND METHOD

[75] Inventors: Vincent W. Wang, San Jose; Jih-Hsien Soong, Cupertino; Hongjun Shu, Sunnyvale; Tzoyao Chan, Saratoga, all of Calif.

[73] Assignee: Cirrus Logic, Inc., Fremont, Calif.

[21] Appl. No.: 770,453

[22] Filed: Dec. 20, 1996

[51] Int. Cl.⁶ .................................................. G06F 13/16
[52] U.S. Cl. ........................ 345/521; 345/425; 345/430; 345/508; 345/516
[58] Field of Search .................................... 345/425, 430, 345/501, 507–509, 515, 516, 521, 203; 711/118, 100

[56] References Cited

U.S. PATENT DOCUMENTS

| | | | |
|---|---|---|---|
| 5,469,535 | 11/1995 | Jarvis et al. | 345/430 |
| 5,606,650 | 2/1997 | Kelley et al. | 345/430 |

*Primary Examiner*—Kee M. Tung
*Attorney, Agent, or Firm*—Wagner, Murabito & Hao; Steven A. Shaw

[57] ABSTRACT

A circuit and method for increasing the processing efficiency of texture map data requests within a 3D subunit of a computer controlled graphics display system. The 3D graphics display subsystem includes a polygon engine, a texture map engine and a pixel pipeline. The texture map engine contains a texture map data access (TDA) circuit having a cache controller with a computer readable cache memory for containing recently used texture maps stored in (u,v) coordinate space. The cache controller is limited in handling only n cache miss operations simultaneously. In one embodiment, n is 1. The TDA circuit also contains a texture map address (TMA) FIFO memory unit for storing texture map addresses associated with texture data requests that hit or missed in the cache memory unit. Since the cache controller handles up to n misses, the texture engine stalls when the $(n+1)^{th}$ unprocessed texture request miss is encountered. Therefore, the TMA FIFO at any time contains at most n miss addresses therein. Processing efficiency is increased when a miss is encountered but the TMA FIFO contains unprocessed hit addresses. At this time, simultaneously with the cache controller fetching the texture data for the missed address, it can also advantageously: (1) supply data from the cache memory for the previously encountered and stored hit addresses; and (2) accept new hit addresses into the TMA FIFO thereby effectively avoiding a texture engine stall. This is quite unlike the prior art systems which process no hit addresses upon a texture miss but rather stall the texture engine.

20 Claims, 11 Drawing Sheets

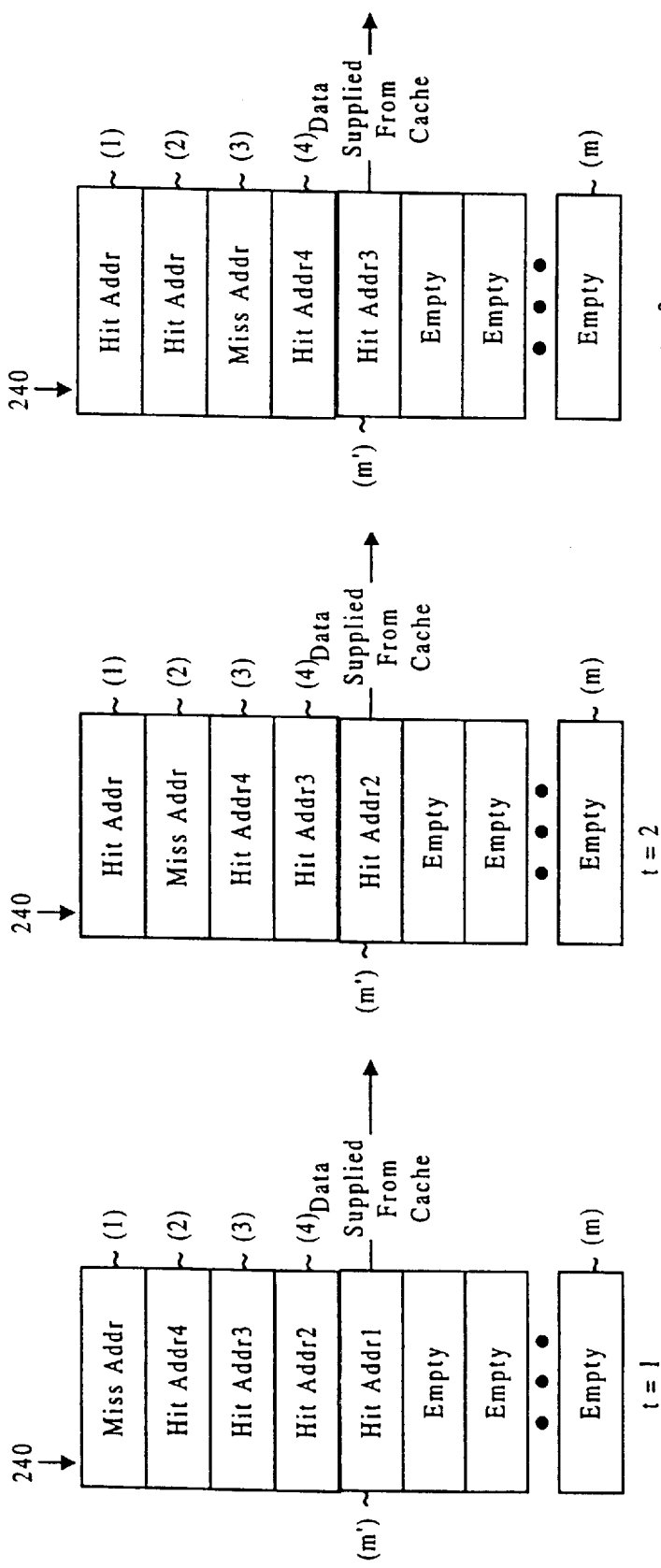

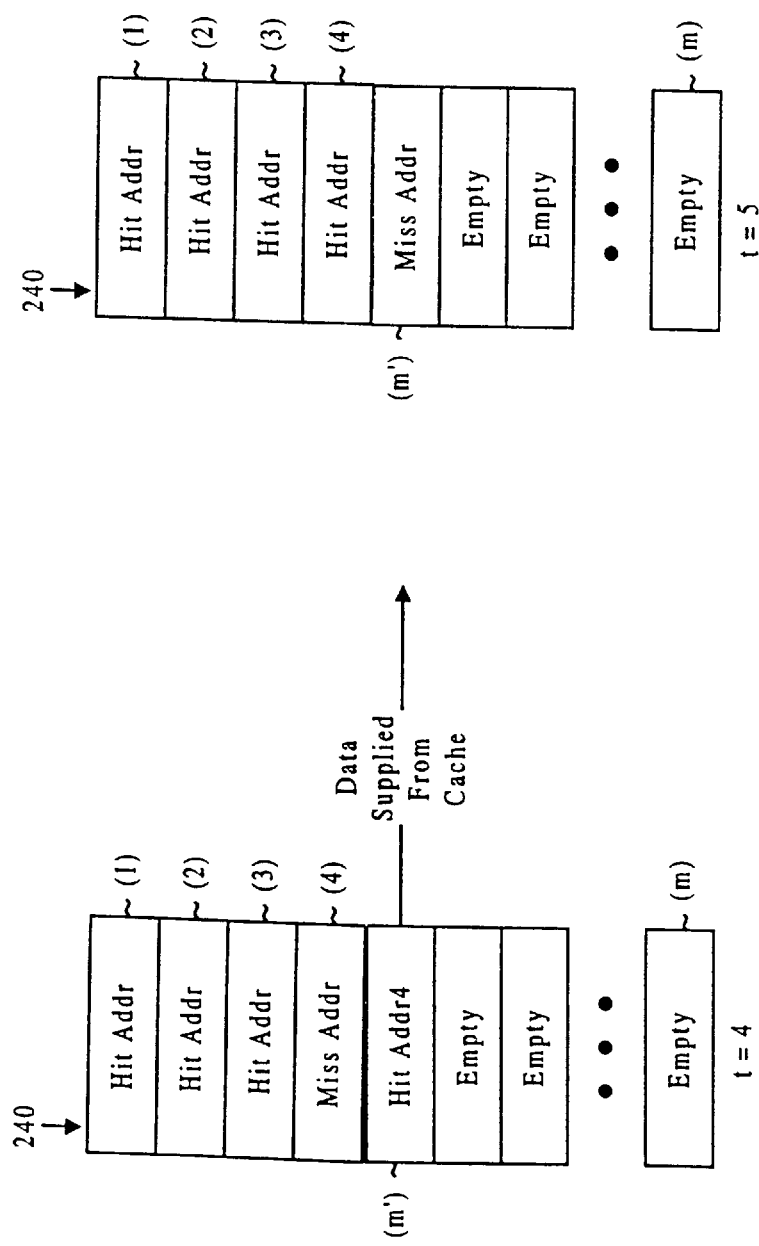

ENHANCED TEXTURE MAP DATA FETCHING CIRCUIT AND METHOD

FIELD OF THE INVENTION

The present invention relates to the field of computer controlled graphics display systems. Specifically, the present invention relates to a system and method for enhancing data throughput in a texture map data retrieval subsystem.

BACKGROUND OF THE INVENTION

The computer controlled graphics display systems typically provide data and control signals to graphics hardware units (e.g., "graphics cards", "motherboards") which contain specialized circuits and encoded procedures for processing graphics instructions at high speeds. The graphics instructions are typically stored in a "display list" within computer memory. The instructions define the rendering of several graphic primitives, e.g., individual points, lines, polygons, fills, BIT BLTs (bit block transfers), textures, etc., and graphics commands. Collections of graphics primitives can be used to render a two dimensional image on a display screen of an object that is represented in three dimensional space. Rendering involves translating the above graphics primitives and graphics instructions into raster encoded data that is then loaded into a frame buffer memory for display ("refresh") on the display screen.

Some polygon graphics primitives include specifications of texture data, representative of graphic images, to be displayed within the polygon. Texture mapping refers to techniques for adding surface detail to areas or surfaces of the polygons displayed on the two dimensional display screen. Since the original graphics object is three dimensional, texture mapping often involves maintaining certain perspective attributes with respect to the surface detail added to the primitive. Stored in memory, a typical texture map includes point elements ("texels") which reside in a (u, v) texture coordinate space. A texture image is represented in computer memory as a bitmap or other raster-based encoded format. Further, the display screen includes point elements (pixels) which reside in an (x, y) display coordinate space.

Generally, the process of texture mapping occurs by accessing encoded surface detail points or "texels" from a memory unit that stores the surface detail (e.g., an image) and transferring the surface detail texels to predetermined points of the graphics primitive to be texture mapped. The individual texels of the texture map data are read out of memory and applied within their polygon in particular fashions depending on the placement and perspective of their associated polygon. Thus, color values for pixels in (x, y) display coordinate space are determined based on sampled texture map values. The process of texture mapping operates by applying color or visual attributes of texels of the (u, v) texture map to corresponding pixels of the graphics primitive on the display screen. After texture mapping, a version of the texture image is visible on surfaces of the graphics primitive, with the proper perspective, if any.

However, the process of texture mapping requires a great demand on the memory capacity of the graphics display system because a lot of texture maps are accessed from memory during a typical display screen update cycle. Since the frequency of the screen update cycles is rapid, the individual polygons of the screen (and related texture map data per polygon) need to be accessed and updated at an extremely rapid frequency requiring great data throughput capacities. In view of the above memory demands, high performance graphics hardware units typically contain low access time cache memory units and cache memory controller units for storing and retrieving texture mapped data at high speeds. With texture caches, as a texture-mapped polygon is processed through the graphics unit, an address check is made by the graphics controller as to whether or not the texture map for the polygon is stored in the texture cache. If the requested memory addresses are not present in the texture cache, the cache controller unit of the prior art system stalls while the desired texture data is obtained from external memory. Usually, there is a long latency (stall) from the cache controller unit sending out the external memory request until the texture data is actually fetched from the external memory.

During the stall period, certain portions of the graphics unit wait for the cache controller to replace the least recently used (LRU) set of cache data with newly fetched data from an external source. Meanwhile, many portions of the graphics unit are momentarily prevented from performing useful work either because the source of their data is stalled (e.g., the texture engine is stalled because the requested texels are not present) or because the unit that receives data from them is busy and will not accept their data. In view of pressing demands for ever increasing graphics data throughputs (e.g., for real-time audio/video multi-media applications), the above latency condition is disadvantageous in a high performance graphics display system.

Accordingly, the present invention provides a system and method for providing efficient texture map data retrieval in a computer controlled graphics display system. Further, the present invention provides a system as above that provides a texture data cache controller unit that can perform useful texture data processing while waiting for fetched texture data associated with a texture cache miss. These and other advantageous not specifically recited above will become clear within discussions of the present invention to follow.

BRIEF DESCRIPTION OF THE DRAWINGS

FIGS. 7C, 7D, 7E, and 7F illustrate, respectively, texture data stored in the memory cache for a first, second, third, and fourth hit address being supplied simultaneously with the processing of a data fetch operation for a miss address stored in an upper entry of the texture map address FIFO memory unit.

FIG. 7G illustrates that during the processing of a data fetch operation for the miss address of FIGS. 7B–7F, subsequently received hit addresses were placed within the upper portion of the texture map address FIFO memory unit.

SUMMARY OF THE INVENTION

Figure 1:
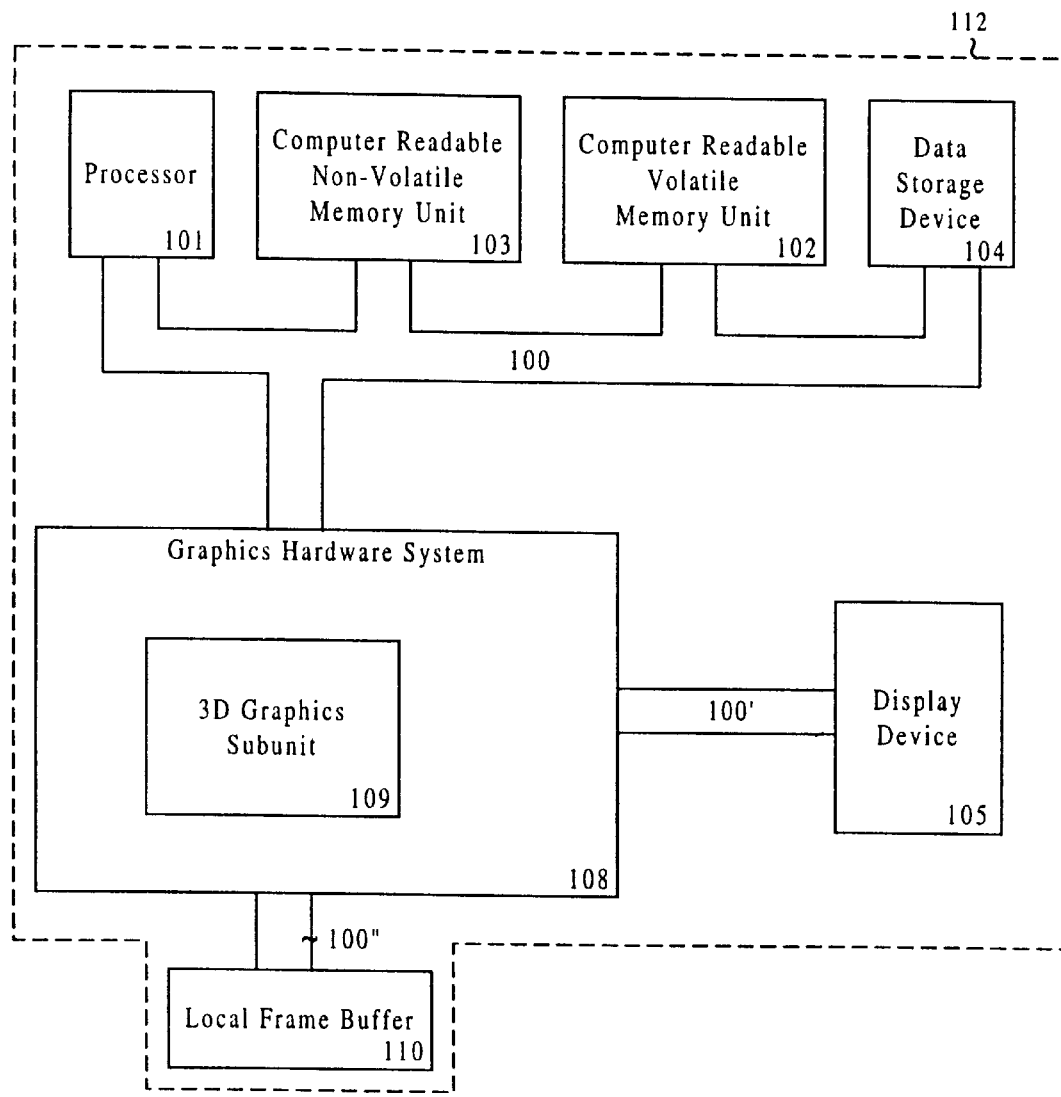
FIG. 1 is a block diagram of a computer controlled graphics display system in accordance with the present invention.

A circuit and method are described for increasing the processing efficiency of texture map data requests within a computer controlled graphics display system. A 3D graphics display subunit is included in the graphics display system and this subunit includes a polygon engine, a texture map engine, and pixel pipeline. The texture map engine contains a texture map data access (TDA) circuit having a cache controller with a computer readable cache memory for containing recently used texture maps stored in (u,v) coordinate space. The cache controller is limited in handling only n cache miss operations simultaneously. In one embodiment, n is 1. The TDA circuit also contains a texture map address FIFO memory unit for storing texture map addresses associated with texture data requests that hit or missed in the cache memory unit. Since the cache controller handles up to n misses, the texture engine stalls when the $(n+1)^{th}$ unprocessed texture request miss is encountered. Therefore, the TMA FIFO at any time contains at most n miss addresses therein. Processing efficiency is increased when a miss is encountered but the TMA FIFO contains unprocessed hit addresses. At this time, simultaneously with the cache controller fetching the texture data for the missed address, it can also advantageously: (1) supply data from the cache memory for the previously encountered and stored hit addresses; and (2) accept new hit addresses into the TMA FIFO thereby effectively avoiding a texture engine stall. This is quite unlike the prior art systems which process no hit addresses upon a texture miss but rather stall the texture engine.

Specifically, embodiments of the present invention include a computer controlled graphics display system having a host processor for executing instructions and processing data, a bus coupled to the host processor, a display screen for displaying graphics images, and a circuit for retrieving texture map data, the circuit including: main memory (or a local frame buffer) for containing texture map data used for texture mapping operations of graphics primitives; a texture map cache memory for containing recently accessed sub-texture map data of the texture map data of the main memory (or local frame buffer memory); a cache lookup circuit coupled to a cache controller circuit for determining if a received texture map address is a hit address or a miss address with respect to contents of the cache memory; a FIFO memory coupled to the cache lookup circuit for storing a plurality of received texture map addresses; and a cache controller circuit coupled to the main memory, the FIFO memory, and the texture map cache memory, the cache controller circuit (1) for fetching, during a fetch interval, first texture map data from the main memory for storage into the texture map cache memory, the first texture map data corresponding to a texture map miss address stored in a first location of the FIFO memory, and the cache controller circuit,(2) for also providing, within the fetch interval, second texture map data stored within the texture map cache memory, the second texture map data corresponding to a first texture map hit address stored in a second location of the FIFO memory, the first texture map hit address received by the FIFO memory after the texture map miss address.

Embodiments include the above and wherein the cache controller is also for providing, during the fetch interval, third texture map data stored within the texture map cache memory, the third texture map data corresponding to a second texture map hit address stored in a third location of the FIFO memory, the second texture map hit address received by the FIFO memory after the texture map miss address and wherein the FIFO memory is also for receiving and storing texture map hit addresses during the fetch interval.

DESCRIPTION OF THE PREFERRED EMBODIMENTS

In the following detailed description of the present invention, an efficient texture data retrieval method used in conjunction with a texture data cache memory, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER CONTROLLED GRAPHICS DISPLAY SYSTEM

With reference to FIG. 1, a block diagram is shown of a computer controlled graphics display system 112 used in accordance with the present invention. In general, host computer system 112 used by the an embodiment of the present invention comprises a bus 100 for communicating information, one or more a host processors 101 coupled with the bus 100 for processing information and instructions, a computer readable volatile memory unit 102 (e.g. random access memory unit) coupled with the bus 100 for storing information and instructions for the host processor 101 or other PCI masters, a computer readable non-volatile memory unit 103 (e.g., read only memory unit) coupled with the bus 100 for storing static information and instructions for the host processor 101, a computer readable data storage device 104 such as a magnetic or optical disk and disk drive (e.g., hard drive or floppy diskette) coupled with the bus 100 for storing information and instructions, and a display device 105 coupled to the bus 100 for displaying information to the computer user. The display device 105 utilized with the computer system 112 of the present invention can be a liquid crystal device, cathode ray tube, or other display device suitable for creating graphic images and alphanumeric characters recognizable to the user.

The host computer system 112 provides data and control signals via bus 100 to a graphics hardware unit or system, e.g., "graphics card" 108. The graphics hardware system 108 contains a 3D graphics subunit 109 for executing a series of display instructions found within a display list stored in computer memory. The display list generally contains instructions regarding the rendering of several graphic primitives, e.g., individual points, lines, polygons, fills, BIT BLTs (bit block transfers), textures, etc. Many of the polygon display instructions include texture data to be displayed within the polygon. Texture data is stored in computer readable (e.g., volatile) memory units of system 112, or local frame buffer 110) in the form of raster based data (e.g., in one form its bit mapped) stored in (u,v) coordinates. The individual components (e.g., "texels") of the texture data are read out of memory and applied within their polygon in particular fashions depending on the placement and perspective of their associated polygon. The process of rendering a polygon with associated texture data is called "texture mapping." Texture mapping requires a great demand on the memory capacity of the computer system 112 because many texture maps are accessed from memory to construct a displayed frame. Since screen updates need to be performed rapidly, polygons need to be updated very rapidly and further texture maps need to be accessed and applied in extremely rapid fashion, increasing memory demands. The graphics hardware system 108, over bus 100", supplies data and control signals to a local frame buffer memory 110 which refreshes the display device 105 for rendering images (including graphics images) on display device 105. Components of the graphics hardware system 108 (e.g., the 3D graphics subunit 109) are discussed in more detail below.

Figure 2:
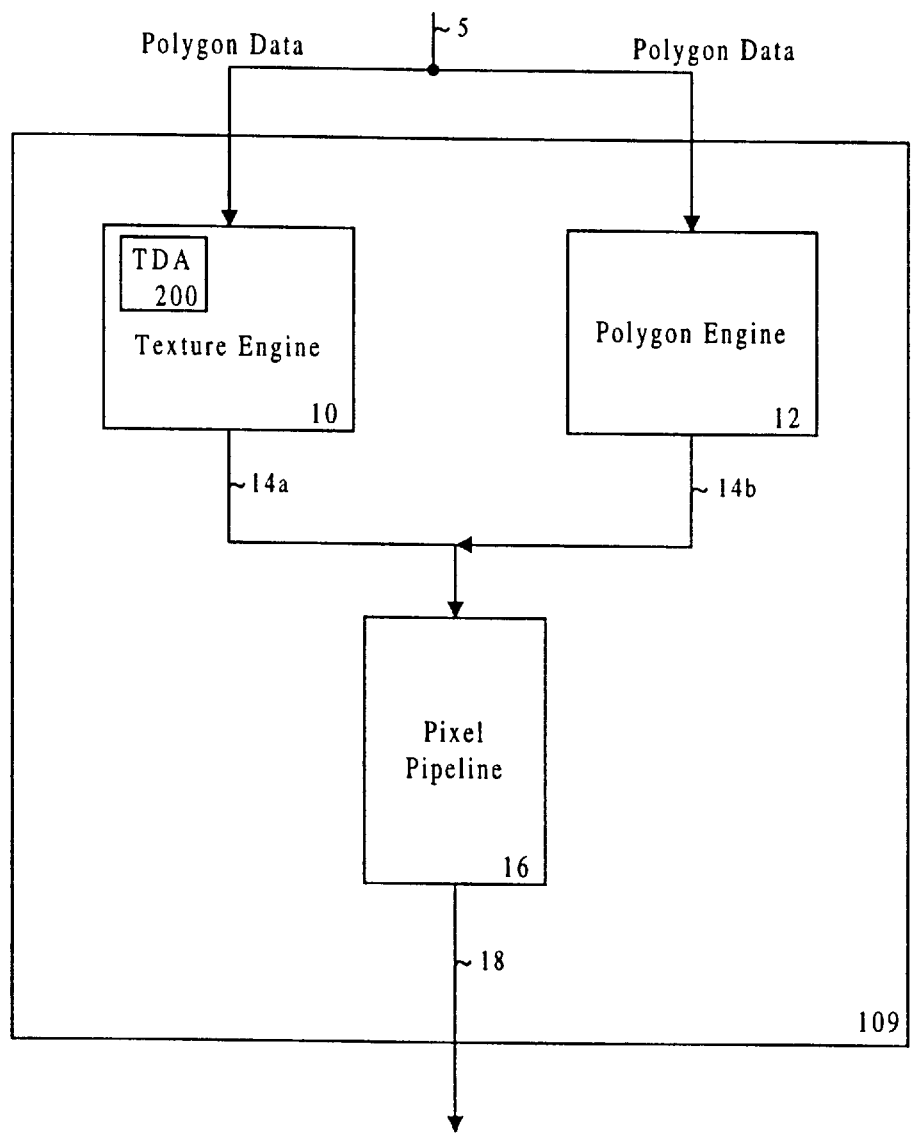
FIG. 2 is a block diagram of the 3D graphics subunit of the computer controlled graphics display system in accordance with the present invention.

FIG. 2 illustrates a portion of the circuitry of the graphics subunit 109 including a texture engine 10, a polygon engine 12 and a pixel pipeline 16. The texture engine 10 receives polygon vertex data over bus 5 that corresponds to respective polygons to be rendered. The polygon vertex data includes data points for each vertex of the polygon. With respect to triangle polygons, each of the three vertexes contains: its own position coordinate values (x, y, z); its own color values (red, green, blue); its own texture map coordinate values (u, v), its own perspective value (w), and other required values including an identification of the texture map data for the polygon, if any. The texture engine 10 is responsible for retrieving the texture map data for the polygon and mapping the texels of the texture data onto the pixels of the polygon. Once the texture engine 10 is given the texture map coordinates (u,v) for each vertex of a triangle, it can go to the texture cache controller 250 and access the matching texels for placement into the triangle. During this process, the texture engine 10 maintains the three dimensional perspective of the surface of the polygon. Texture map data retrieval (TDA) circuit 200 performs texture map data retrieval processes in accordance with the present invention. Aside from the texture retrieval system of texture engine 10, a number of well known procedures and circuits can be used to maintain the perspective and perform the texture mapping operations implemented within texture engine 10. Texture map pixel data is supplied from the texture engine 10 to the pixel pipeline 16 over bus 14a.

The polygon engine 12 of FIG. 2 receives the polygon data over bus 5 and performs well known polygon rendering functions with respect to the position, color, and perspective of the polygon primitive. Essentially, polygon engine uses interpolation to compute the pixel positions and colors of the pixels within the polygon primitive based on the polygon vertex data. Pixel information resulting from the polygon engine 12 is forwarded to the pixel pipeline over bus 14b. The pixel pipeline 16 blends the texture data (texels) from the texture engine 10 with the pixel data from the polygon engine 12 to form a composite polygon image. The data (pixels) of the composite image are forwarded in raster encoded format over bus 18, stored in a raster encoded frame buffer (situated within graphics subunit 109, but not shown in FIG. 2), and eventually displayed on display screen 105 (FIG. 1). The above operation is performed individually for each received polygon primitive. The pixel pipeline 16, in one embodiment, contains a latency of approximately 5–7 clock cycles, depending on programmable image features.

TEXTURE MAP DATA RETRIEVAL (TDA) CIRCUIT 200 OF THE PRESENT INVENTION

Figure 3:
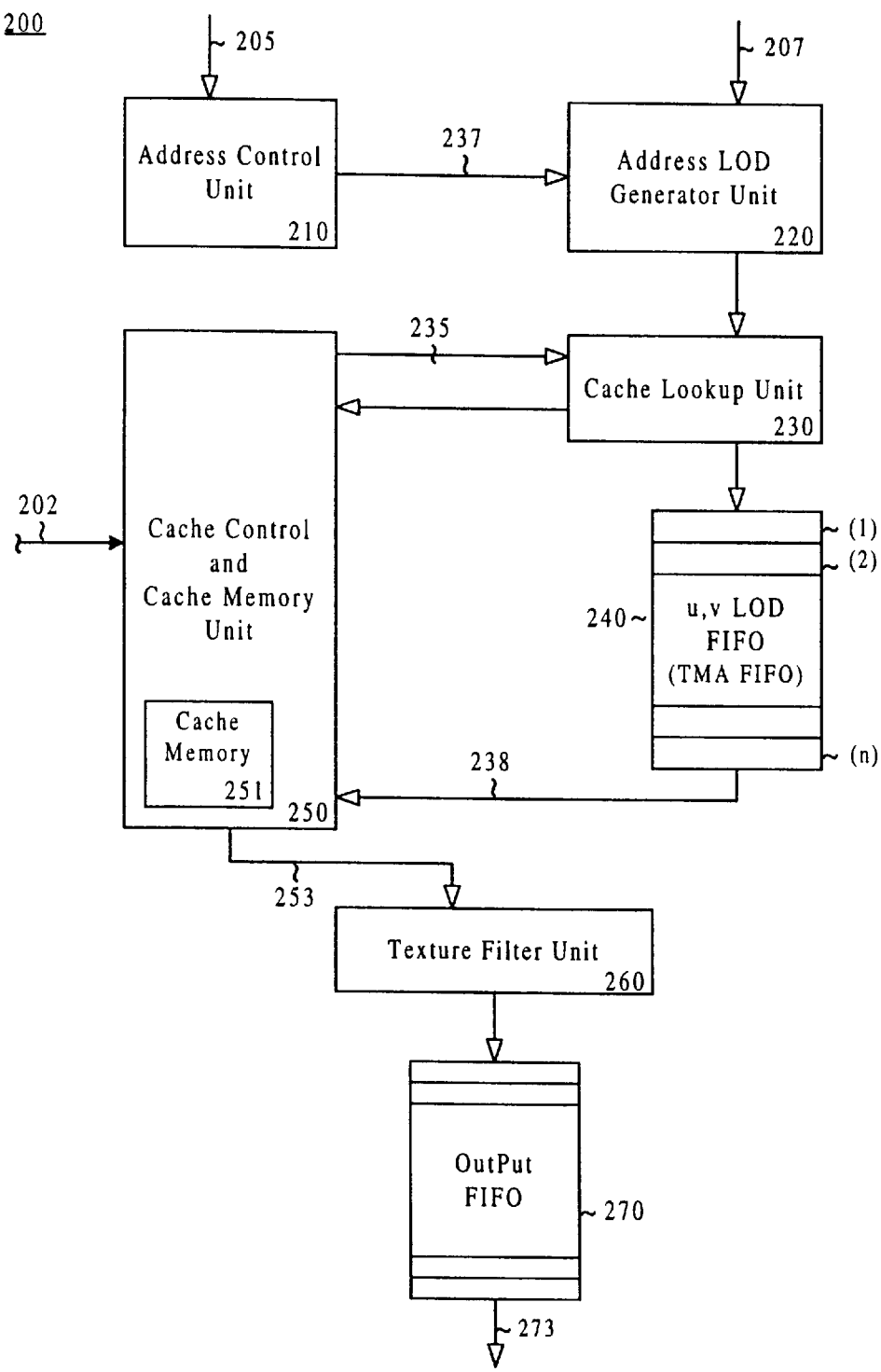
FIG. 3 is a block diagram of the texture map data access (TDA) circuit of the graphics unit in accordance with the present invention.

FIG. 3 illustrates the components of the texture map data access (TDA) circuit 200 in accordance with the present invention. TDA circuit 200 provides an efficient mechanism for processing texture map data requests (in the form of addresses) whereby useful texture map data can be supplied from a cache memory 251 to the filter 260 simultaneously during a fetch interval wherein other texture data is being fetched from main memory 102 or from a local frame buffer 110 (FIG. 1). This operation is unlike the prior art where during a fetch interval, the texture engine stalls and no useful texture map data is provided until the fetch completes. Further, during the fetch interval, later received hit addresses can be accepted by the TDA circuit 200 thereby preventing the stall out of circuits that supply addresses to the TDA circuit 200.

As discussed above, the polygon data received by the texture engine 10 contains an indication (e.g., a pointer) of the texture map (e.g., a base address of the texture map) used by the currently processed polygon. The TDA circuit 200 contains an address control unit 210 which receives, over bus 205, the above referenced texture map base address. The texture map base address information is also forwarded over bus 207 to an address generator unit 220. The address generator unit 220 is controlled by control signals of line 237 that originate from the address control unit 210. Address generator unit 220 also receives (u,v) texture coordinates corresponding to the current polygon primitive. The address generator unit 220 generates the (u,v) texel addresses and level of detail (LOD) information for each corresponding pixel of a polygon primitive. These newly "received" texture map addresses ("texel addresses") are individually forwarded from unit 220 to a cache lookup unit 230.

A number of different texel address generation mechanisms can be used by address generator unit 220 within the present invention. In one embodiment, the address generator unit 220 inputs the u_main, v_main, du_main, du_ortho, dv_main, and dv_ortho to compute the required texel adresses. In this embodiment, these terms are defined in copending patent application Ser. No. 08/774,787 filed Dec. 30, 1996, and entitled "Non-Homogenous Second Order Perspective Texture Mapping Coordinates Using Linear Interpolation," by Vaswani et al., assigned to the assignee of the present invention with attorney docket number 0542-VDSK.

The cache lookup unit 230 of FIG. 3 uses control and address bus 235 to examine the contents of a texture map cache memory circuit ("cache memory") 251 to determine if each received texture map address corresponds to texture map data stored in the cache memory 251. The cache memory 251 is situated within a cache controller circuit 250 and in one embodiment is a 16-set fully-associated cache of a predetermined size (e.g., 1k bytes). In one embodiment, the cache memory 251 is divided into 16 sets (64 bytes each). If a received texture map address corresponds to texture map data stored in the cache circuit 251, then it is a texture map hit address ("hit address"). If a received texture map address does not correspond to texture map data stored in the cache circuit 251, then it is a texture map miss address ("miss address"). In the latter case, a fetch interval is required for the cache controller circuit 250 causing it to fetch the required texture map data from main memory 102 or local frame buffer 110 for storage into the cache memory 251. In one embodiment, a block of texture data representing portions of several screen lines (e.g., 64 bytes corresponding to a single set size) is retrieved for each fetch interval. The fetched texture map data is fetched in 64 byte blocks (corresponding to a set) each comprising an 8×8 matrix of texture map data (8 bits per a texel), in one embodiment of the present invention.

The cache controller 250 contains circuitry for performing n simultaneous fetch operations wherein texture data is fetched from main memory 102 (or local frame buffer 110) and stored within the cache memory 251. In one embodiment, n=1. When more than n fetch operations are required, the additional fetch operations are delayed until the n fetch operations are complete. In the embodiment described above, when a second fetch operation is required and a pending fetch operation is not yet complete, the second fetch operation is delayed until the completion of the pending fetch operation. The interval of a fetch operation is called the fetch interval. The fetch operation uses bus 202 which is communicatively interfaced with bus 100 of system 112 to receive texture map data from main memory 102 or bus 100" from local frame buffer 110. A number of well known circuits and techniques can be used by the cache controller circuit 250 within the scope of the present invention for implementing the texture map data fetch operation.

In one embodiment of the present invention, in parallel (e.g., simultaneous) with a fetch operation, cache controller circuit 250 and cache memory 251 can be used to supply texture map data, stored within cache memory 251, that corresponds to texture map hit addresses that were received before the commencement of the fetch interval.

A first-in-first-out (FIFO) memory circuit 240 of FIG. 3 is coupled to input received texture map addresses from cache lookup unit 230. FIFO memory 240 (also called TMA FIFO) contains a number of entries, (1)–(m), for storing hit or miss addresses. Texture map addresses that are at the bottom entry (physical or logical) of the FIFO memory unit 240 are processed such that their corresponding texture map data is retrieved from the cache memory unit 251 and supplied over bus 253 if the texel is available in the texture cache 251. The cache memory unit 251 is addressed by the bottom entry of FIFO memory 240 over address and control bus 238. If the texture map data corresponding to the bottom entry address is not yet available in the cache memory 251, FIFO memory 240 is stalled until the data becomes available. When the corresponding texture map data is supplied from cache memory 251, the bottom entry texture map address is removed from FIFO memory 240.

Filter unit 260 receives texture map data over bus 253 from the cache controller circuit 250 and performs a number of well known data filtering operations, including performing linear filtering, bi-linear filtering, and tri-linear filtering. The filter unit 260 then outputs the texture map data for the polygon to an optional output FIFO 270 which is coupled to external bus 273. Bus 273 is coupled to bus 14a (FIG. 2) to the pixel pipeline circuit 16.

Figure 4A:
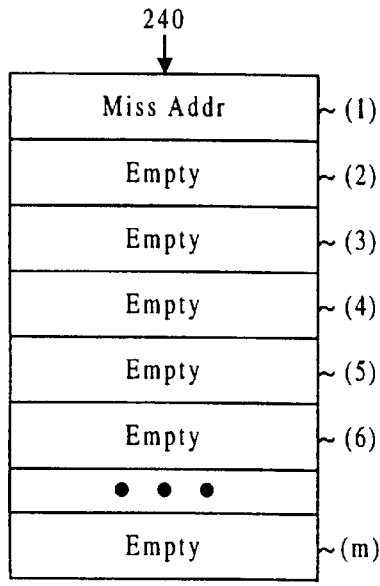
FIG. 4A and FIG. 4B illustrate, respectively, a texture map data request miss address and a texture map data request hit address being placed on the top entry of the texture map address (TMA) FIFO memory unit of the present invention.
Figure 4B:
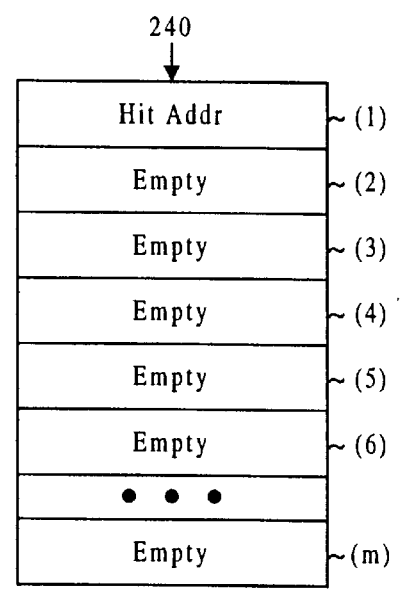

The operation of the FIFO memory 240 of TDA circuit 200 of the present invention is now explained. FIG. 4A illustrates a FIFO configuration wherein the FIFO memory 240 is empty and a miss address is pushed into the top entry (1). Upon this configuration, cache controller 250 commences a fetch interval to obtain the texture map data for the miss address. FIG. 4B illustrates a FIFO configuration wherein the FIFO memory 240 is empty and a hit address is pushed into the top entry (1).

Figure 5A:
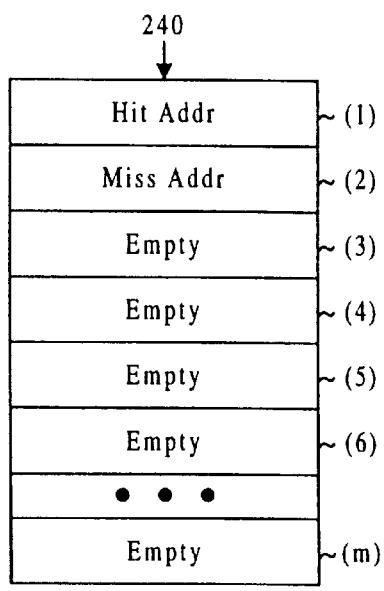
FIG. 5A and FIG. 5B illustrate, respectively, a texture map data request hit address being placed on the top entry of the texture map address FIFO memory unit after the FIFO configurations of FIG. 4A and FIG. 4B.
Figure 5B:
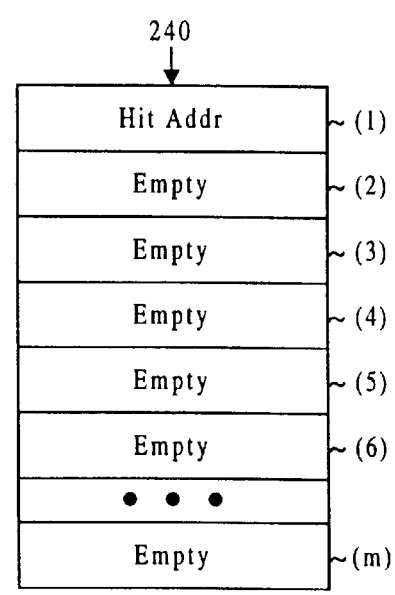

FIG. 5A illustrates the FIFO configuration of FIG. 4A, but a later received hit address is next pushed onto the top entry (1) and the miss address is then copied into entry (2). It is appreciated that in this configuration, the fetch interval for the miss address of entry (2) is not yet complete. FIG. 5A illustrates that multiple later received hit addresses can be pushed onto the FIFO memory 240 during a fetch interval. This later received hit address, although not yet processed by the cache memory unit 251, remains in the FIFO memory 240. Therefore, the present invention advantageously allows the TDA circuit 200 to accept new texture map addresses during a fetch interval thus preventing the stall out of circuitry that supplies these texture map addresses during the fetch interval. FIG. 5B illustrates the FIFO configuration of FIG. 4B, but a later received hit address is next pushed onto the top entry (1) and the first hit address is popped out of the FIFO 240.

Figures 6A, 6B:
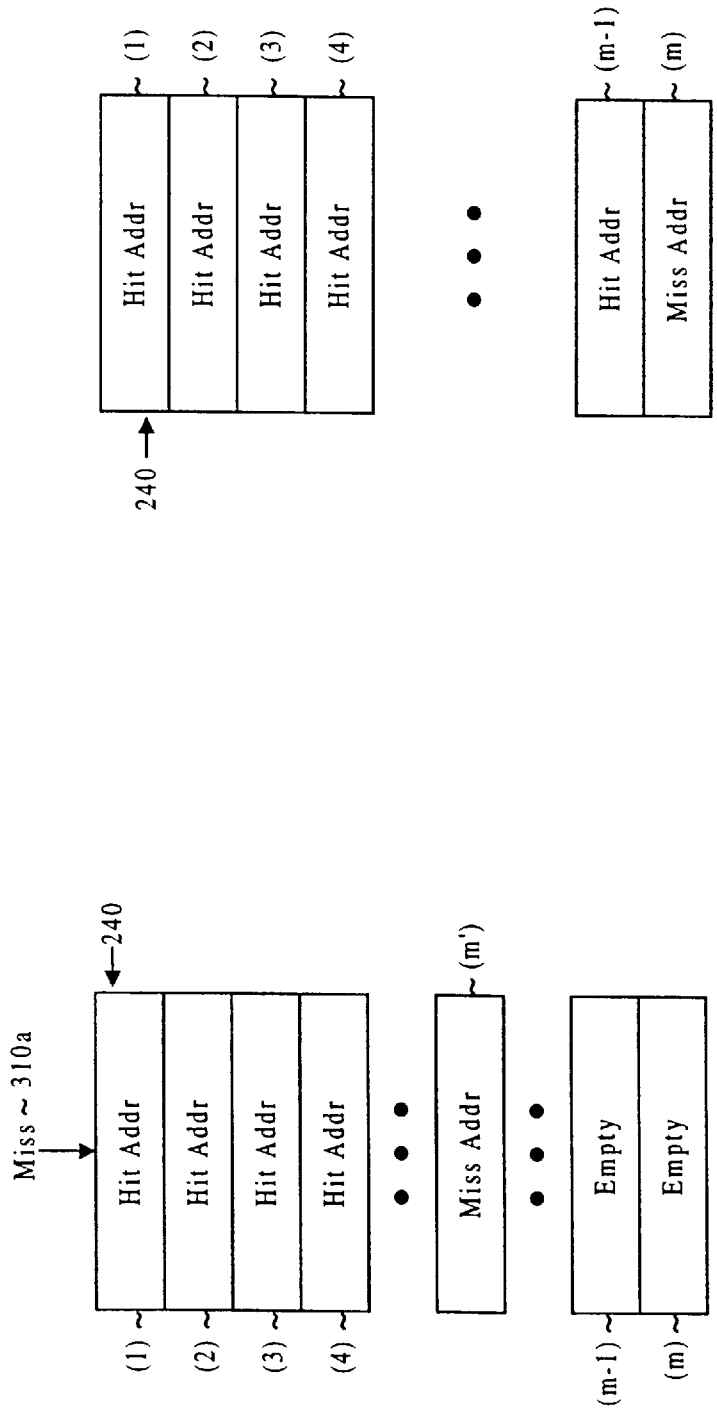
FIG. 6A illustrates a first texture engine stall condition whereby an $(n+1)^{th}$ unprocessed miss address is received by the cache controller of the present invention.
FIG. 6B illustrates a second texture engine stall condition whereby a miss address reaches the last entry of the texture map address FIFO memory unit but the cache controller has not yet finished its data fetch operation.

FIG. 6A and FIG. 6B illustrate two FIFO configurations that cause a FIFO memory 240 stall condition. During a stall, the FIFO memory 240 and the TDA circuit 200 does not accept any more texture map addresses. FIG. 6A illustrates a FIFO stall configuration where an early received miss address is near the bottom of the FIFO memory 240 in entry (m'), a number of hit addresses were received and stored in entries (1) through (m'−1), and then another miss address 310a is received. The miss address in entry (m') is still pending, e.g., its fetch interval is still open. In the embodiment wherein n=1, this condition causes a FIFO stall because the cache controller circuit 250 can only process one fetch interval at a time. Therefore, the FIFO memory 240 stalls and does not accept new texture map addresses until it removes the miss address in entry (m').

FIG. 6B illustrates a second FIFO stall configuration where a pending miss address reaches the bottom entry, (m), of the of the FIFO memory 240 and the remainder of the FIFO memory 240, entries (1)–(m−1), are filled with hit addresses. Although no new texture map address is received, in this configuration the texture map data corresponding to the miss address in entry (m) is not yet available because its fetch interval is not yet complete. In this configuration, the FIFO memory 240 stalls until the texture map data for the miss address in entry (m) becomes available, at which time this miss address is removed from the FIFO memory 240.

Figure 7A:
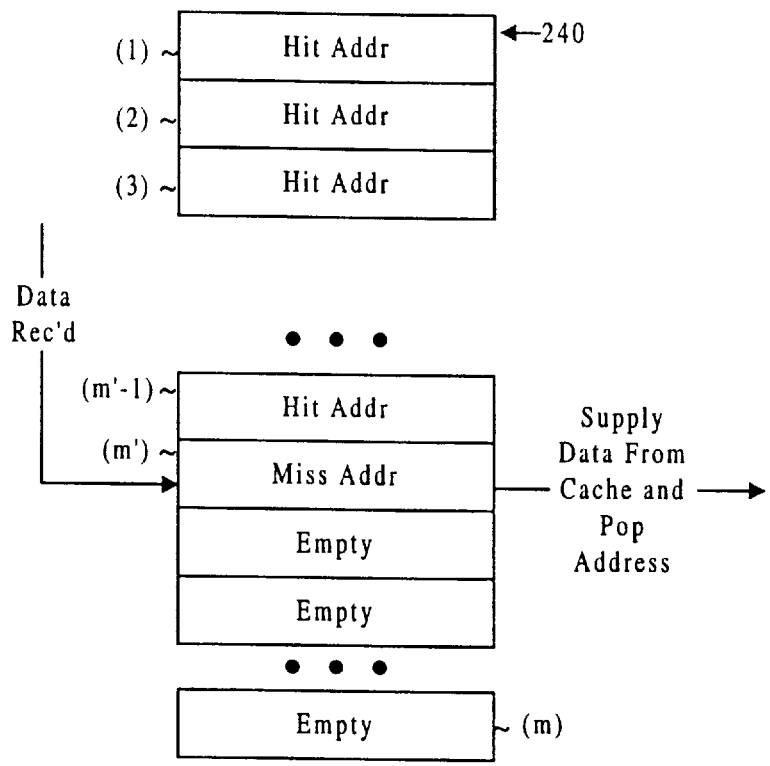
FIG. 7A is an illustration of a FIFO configuration of the texture map address FIFO memory unit wherein fetched texture data is supplied for miss address that is the oldest address in the texture map address FIFO memory unit.

FIG. 7A illustrates that the "bottom" entry of the FIFO memory 240 can be viewed as the actual last physical entry (m) or as a logical bottom entry defined as the entry that contains the oldest texture map address. In one embodiment of the present invention, the last physical entry (m) of the FIFO memory 240 is used to address the cache memory 251 to retrieve the corresponding texture map data. However, as shown in FIG. 7A, the logical bottom entry (m') can also be used in another embodiment of the present invention. In FIG. 7A, a miss address is at position (m') being the oldest address within the FIFO memory 240 and other subsequently received hit addresses are stored in entries (1)–(m'−1). At this time, the fetch interval for the miss address at entry (m') completes causing its corresponding texture data to be supplied from cache memory 251. The miss address in entry (m') is then removed from the FIFO memory 240.

Figure 7B:
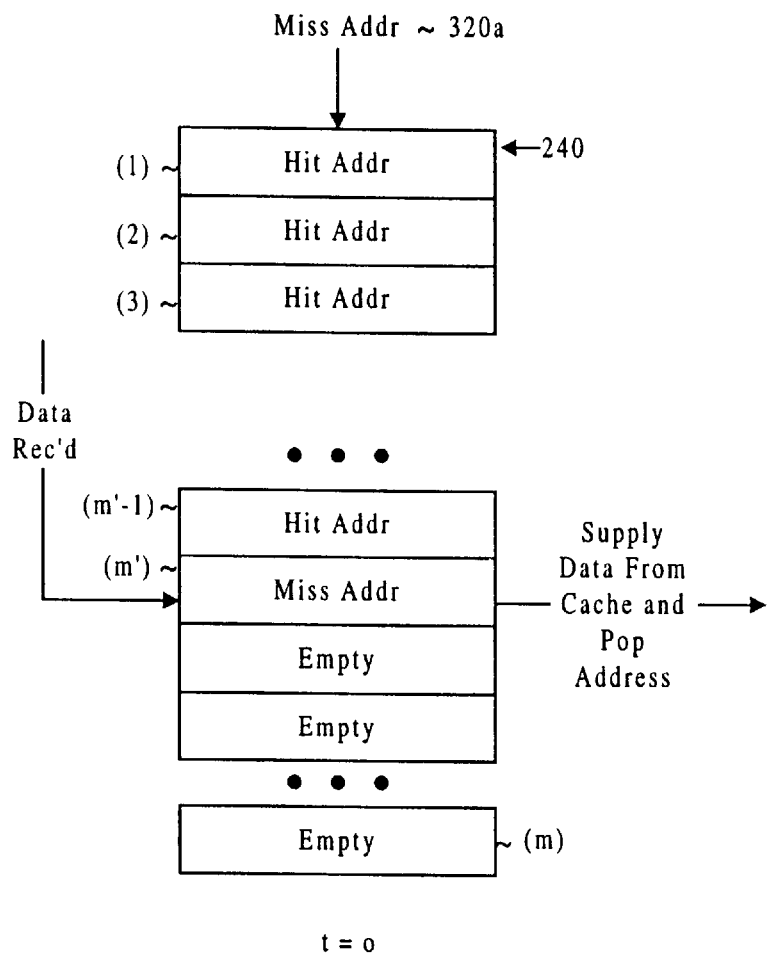
FIG. 7B is an illustration of a FIFO configuration of the texture map address FIFO memory unit as shown in FIG. 7A with an $(n+1)^{th}$ miss address simultaneously entering into the texture map address FIFO memory unit.

FIGS. 7B–7G illustrate an effective use of the TDA circuit 200 of the present invention for texture map data retrieval wherein texture map data is supplied to the texture engine 10 from the TDA circuit 200 during a fetch interval. FIG. 7B illustrates a FIFO configuration where a first miss address is pending and stored in the (m') entry, several hit addresses are stored in entries (1) through (m'−1) of FIFO memory 240, and then a second miss address 320a is received. At this moment, t=0, the texture map data for the first miss address becomes available in the cache memory 251, as shown in FIG. 7B.

FIG. 7C illustrates the FIFO configuration at the next clock cycle, t=1, where the second miss address becomes stored in entry (1) and the hit addresses are each shifted down to occupy entries (2)–(m') of the FIFO memory 240. Also at t=1, the cache controller circuit 250 commences a fetch interval to retrieve the texture map data from main memory 102 for the second miss address. Simultaneous with this fetch interval, the cache controller circuit 250 also accesses the cache memory 251 with the hit address (address1) located at the bottom entry (m') of the FIFO memory 240 (either physical bottom or logical bottom). The cache controller circuit 250 then supplies the texture map data corresponding to this hit address 1 to the texture filter 260. Therefore, the present invention TDA circuit 200 advantageously allows texture data to be supplied during a texture data fetch interval.

FIG. 7D illustrates the FIFO configuration at the next clock cycle, t=2, where the second miss address is stored in entry (2) and the previously received hit addresses are each shifted down to occupy entries (3)–(m') of the FIFO memory 240. Also, a newly received hit address is shifted into entry (1) of FIFO memory 240. Thus, the present invention, during a fetch interval, allows the FIFO memory 240 to advantageously accept new hit addresses. At t=2, the fetch interval that commenced at t=1 is still pending. Simultaneous with this pending fetch interval, the cache controller circuit 250 also accesses the cache memory 251 with the hit address (address2) located at the bottom entry (m') of the FIFO memory 240 (either physical bottom or logical bottom). The cache controller 250 then supplies the texture map data corresponding to this hit address2 to the texture filter 260.

FIG. 7E illustrates the FIFO configuration at clock cycle t=3 where the second miss address is stored in entry (3) and the previously received hit addresses are each shifted down to occupy entries (4)–(m') of the FIFO memory 240. The hit address received at t=2 is shifted into entry (2) and a newly received hit address is shifted into entry (1) of FIFO memory 240. At t=3, the fetch interval that commenced at t=1 is still pending. Simultaneous with this pending fetch interval, the cache controller circuit 250 also accesses the cache memory 251 with the hit address (address3) located at the bottom entry (m') of the FIFO memory 240 (either physical bottom or logical bottom). The cache controller 250 then supplies the texture map data corresponding to this hit address3 to the texture filter 260.

FIG. 7F illustrates the FIFO configuration at clock cycle t=4 where the second miss address is stored in entry (4) and the only previously received hit address that is left is shifted down into entry (m') of the FIFO memory 240. The hit addresses received at t=3 are shifted to occupy entries (2)–(3) and a newly received hit address is shifted into entry (1) of FIFO memory 240. At t=4, the fetch interval that commenced at t=1 is still pending. Simultaneous with this pending fetch interval, the cache controller circuit 250 also accesses the cache memory 251 with the hit address (address4) located at the bottom entry (m') of the FIFO memory 240. The cache controller 250 then supplies the texture map data corresponding to this hit address4 to the texture filter 260. This process can continue for each next clock cycle provided: (1) there are previously received hit addresses, relative to the pending miss address; and (2) the fetch interval is still pending. It is appreciated that with reference to FIGS. 7C through 7F, after each hit address is processed, it is popped of off the FIFO memory 240.

FIG. 7G illustrates the FIFO configuration at the completion of the pending fetch interval (t>4) when the requested texture data for the miss address becomes stored in the cache memory 251. Next, the cache controller circuit 250 accesses the cache memory 251 with the miss address located at the bottom entry (m') of the FIFO memory 240. The cache controller 250 then supplies the texture map data corresponding to this miss address to the texture filter 260. Next, the hit addresses located in entries (1)–(4) are processed during the next four clock cycles as new texture map addresses are received at the top of FIFO memory 240.

During the cycles t=1 to t=4, the TDA circuit 200 of the present invention advantageously processes hit addresses to supply texture map data during a fetch interval. Also during this interval, new hit addresses are accepted by the FIFO memory unit 240. In order to provide optimum performance gain in this environment, the entry size of the FIFO memory 240 should be roughly equal to the number of clock cycles required to perform a data fetch by the cache controller 250. In one embodiment of the present invention this value is 20 cycles, e.g., (m) should be roughly 20 entries. In one embodiment, each texture map data fetch interval involves the fetching of a block of texture map data, e.g., 64 bytes each corresponding to either four lines of 16 bytes each or eight lines of 8 bytes each.

It is appreciated that in operation, TDA circuit 200 is very effective because texture mapping and texture filtering procedures often operate on texture data that are closely situated within a given address space neighborhood. Therefore, texture map address misses are not usually received back-to-back in time, but are rather spaced out between hit addresses. In this expected operational environment, FIFO memory 240 does not stall often as a result of encountering two pending miss addresses thus providing good data throughput of the cache memory 251.

OPERATION OF TDA CIRCUIT 200 OF THE PRESENT INVENTION

Figure 8:
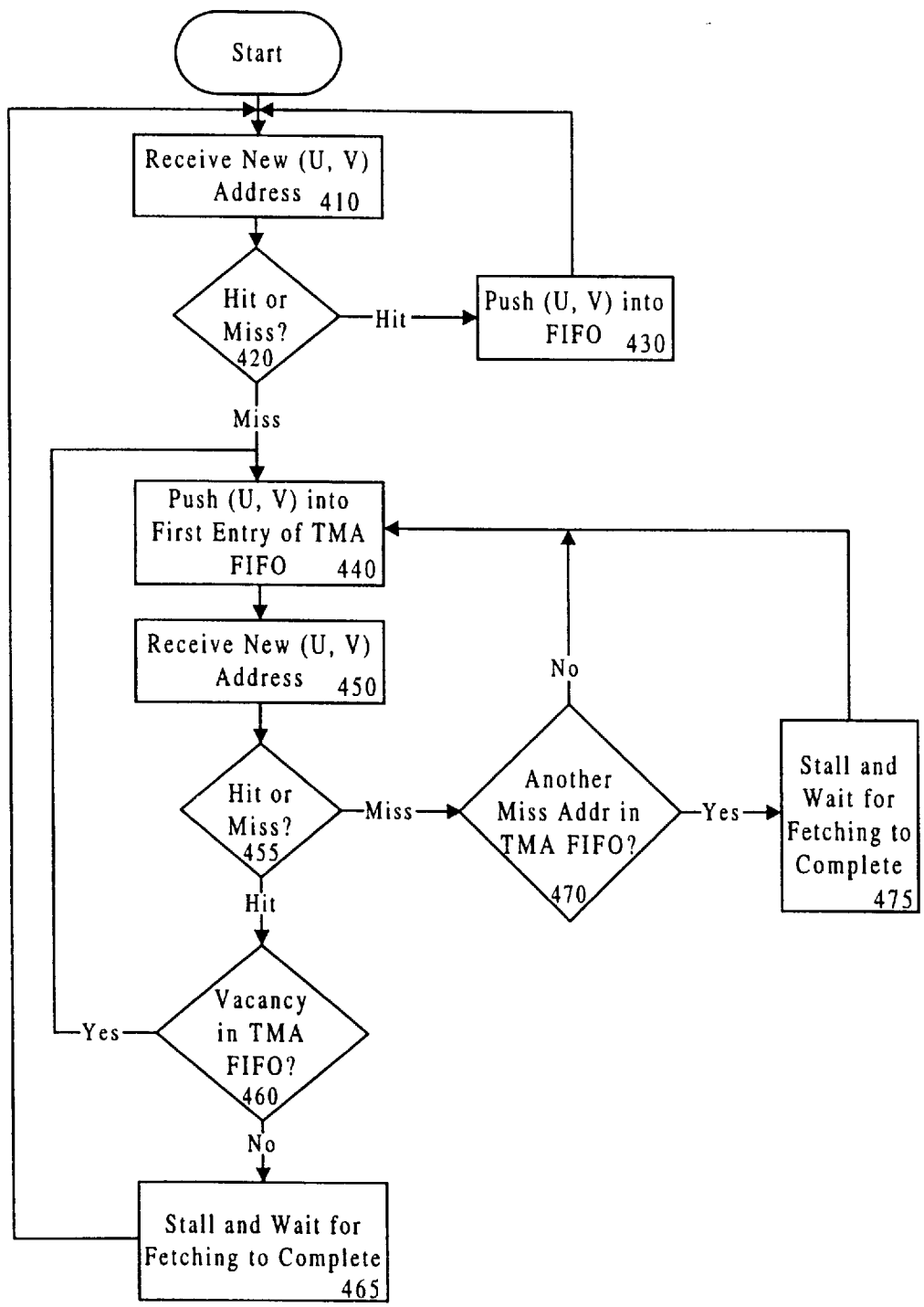
FIG. 8 illustrates steps within a flow chart diagram of the operation of the present invention for placing texture data hit and miss addresses onto the texture map address FIFO memory unit.

FIG. 8 illustrates steps of process 400 performed by the TDA circuit 200 of the present invention for placing new texture map addresses (hit/miss) into the entries of FIFO memory 240. At start, it is assumed that FIFO 240 is empty. Process 400 commences at step 410 where it is checked if a new texture map address is received at address generator unit 220, e.g., new (u,v) coordinates and texture map base address. If so, the address generator circuit 220 computes a new texture map address at step 410. At step 420, the cache lookup circuit 230 checks if the new address is a hit address or a miss address. If the address is a hit address, then step 430 is entered where the hit address is pushed into the FIFO 240 and step 410 is re-entered. At step 420, if the address is a miss address then step 440 is entered.

At step 440, TDA circuit 200 pushes the miss address into the FIFO 240. This commences a fetch interval for the pending miss address. At step 450, when another newly received texture map address is received by the TMA circuit 200, then step 455 is entered. At step 455, the cache lookup circuit 230 checks if the new address is a hit address or a miss address. If the new address is a hit address then at step 460 the TMA circuit 200 checks if there is vacancy in the FIFO 240. If there is vacancy, then step 440 is entered where the newly received address is placed into the FIFO 240. At step 460, if there is no vacancy in the FIFO 240, then step 465 is entered where the TMA circuit 200 stalls and waits until the pending texture data fetching interval is complete so that a new FIFO entry can become available.

At step 455 of FIG. 8, if the newly received address is a miss address, then at step 470 the TMA circuit 200 checks if another miss address is already pending within the TMA FIFO 240. If so, then at step 475 the TMA circuit 200 stalls and waits until the pending texture data fetching interval is complete so that the newly received miss address can be supplied to the cache controller 250. At the completion of step 475, step 440 is then entered to push the new miss address into the FIFO 240. At this time, a fetch interval is commenced causing the cache controller circuit 250 to access main memory 102 (or the local frame buffer 110) to retrieve the texture map data for the newly stored pending miss address. At step 470, if another miss address is not already pending in FIFO 240, then step 440 is entered to push the new miss address into the FIFO 240. At this time, a fetch interval is commenced causing the cache controller circuit 250 to access main memory 102 (or local frame buffer 110) to retrieve the texture map data for the newly stored pending miss address.

Figure 9:
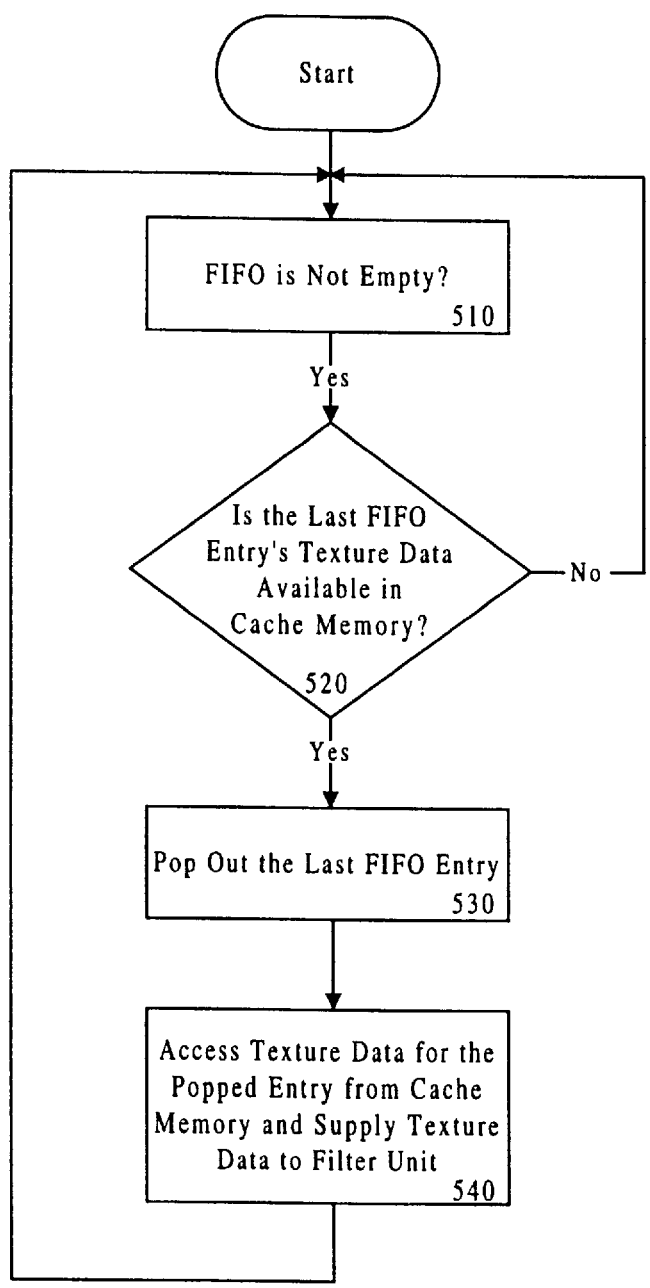
FIG. 9 illustrates steps within a flow chart diagram of the operation of the present invention for removing texture data hit and miss addresses from the texture map address FIFO memory unit.

FIG. 9 illustrates steps of process 500 performed by the TDA circuit 200 of the present invention for removing texture map addresses from the bottom entry of FIFO memory 240. Process 500 commences at step 510 where TDA circuit 200 checks if FIFO 240 is not empty or empty. If not empty, then step 520 is entered. At step 520, the TMA circuit 200 of the present invention checks if the texture data corresponding to the address stored in the last entry (e.g., logical bottom or physical bottom) of the FIFO is present within the cache memory 251. If not, then step 510 is entered. At step 520, if the texture data for the last entry is stored within the texture cache memory 251, then step 530 is entered.

At step 530, the TMA circuit 200 pops out the last FIFO entry from FIFO 240. At step 540, the cache controller 250 accesses texture data from the cache memory 251 corresponding to the last entry address and supplies the texture data to the filter unit 260.

CONCLUSION

The preferred embodiment of the present invention, an efficient texture data retrieval method used in conjunction with a texture data cache memory, is thus described. While the present invention has been described in particular embodiments, it should be appreciated that the present invention should not be construed as limited by such embodiments, but rather construed according to the following claims.

What is claimed is:

1. In a computer controlled graphics display system having a memory unit for containing texture map data used for texture mapping operations of graphics primitives, a circuit for retrieving texture map data, said circuit comprising:

a cache memory for containing recently accessed texture map data of said texture map data of said memory unit;

a cache lookup circuit coupled to a cache controller circuit for determining if a received texture map address is a hit address or a miss address with respect to contents of said cache memory;

a FIFO memory coupled to said cache lookup circuit for storing a plurality of received texture map addresses; and a cache controller circuit coupled to said memory unit, said FIFO memory, and said cache memory, said cache controller circuit (1) for fetching first texture map data from said memory unit for storage into said cache memory, said first texture map data corresponding to a texture map miss address stored in a first location of said FIFO memory, and said cache controller circuit (2) for simultaneously providing second texture map data stored within said cache memory, said second texture map data corresponding to a texture map hit address stored in a second location of said FIFO memory.

2. A circuit as described in claim 1 wherein said first location of said FIFO memory contains data received earlier in time with respect to data contained in said second location.

3. A circuit as described in claim 1 wherein said cache memory is a 16-set fully-associated cache memory.

4. A circuit as described in claim 1 wherein said cache memory is 1k bytes in size.

5. A circuit as described in claim 1 further comprising an address generation circuit coupled to said cache lookup circuit, said address generation circuit for generating said received texture map addresses which respectively correspond to graphics primitives for rendering.

6. A circuit as described in claim 1 wherein said FIFO memory is also for receiving and storing texture map hit addresses during the interval defined wherein said cache controller circuit is fetching said first texture map data from said memory unit for storage into said cache memory.

7. A circuit as described in claim 1 further comprising a texture filter circuit coupled to said cache controller circuit, said texture filter circuit for processing texture map data supplied from said cache controller circuit.

8. A computer controlled graphics display system having a host processor for executing instructions and processing data, a bus coupled to said host processor, a display screen for displaying graphics images, and a circuit for retrieving texture map data, said circuit comprising:

a memory unit for containing texture map data used for texture mapping operations of graphics primitives;

a texture map cache memory for containing recently accessed texture map data of said texture map data of said memory unit;

a cache lookup circuit coupled to a cache controller circuit for determining if a received texture map address is a hit address or a miss address with respect to contents of said cache memory;

a FIFO memory coupled to said cache lookup circuit for storing a plurality of received texture map addresses; and a cache controller circuit coupled to said memory unit, said FIFO memory, and said texture map cache memory, said cache controller circuit (1) for fetching, during a fetch interval, first texture map data from said memory unit for storage into said texture map cache memory, said first texture map data corresponding to a texture map miss address stored in a first location of said FIFO memory, and said cache controller circuit,(2) for also providing, within said fetch interval, second texture map data stored within said texture map cache memory, said second texture map data corresponding to a first texture map hit address stored in a second location of said FIFO memory, said first texture map hit address received by said FIFO memory after said texture map miss address.

9. A system as described in claim 8 wherein said cache controller is also for providing, during said fetch interval, third texture map data stored within said texture map cache memory, said third texture map data corresponding to a second texture map hit address stored in a third location of said FIFO memory, said second texture map hit address received by said FIFO memory after said texture map miss address.

10. A system as described in claim 8 further comprising an address generation circuit coupled to said cache lookup circuit, said address generation circuit for generating said received texture map addresses which respectively correspond to graphics primitives.

11. A system as described in claim 8 wherein said FIFO memory is also for receiving and storing texture map hit addresses during said fetch interval.

12. A system as described in claim 8 wherein said texture map cache memory is a 16-set fully-associated cache memory.

13. A system as described in claim 8 wherein said texture map cache memory is 1k bytes in size.

14. A system as described in claim 8 further comprising a texture filter circuit coupled to said cache controller circuit, said texture filter circuit for processing texture map data supplied by said cache controller circuit.

15. In a computer controlled graphics display system, a method of retrieving texture map data, said method comprising the steps of:

a) storing texture map data in a memory unit, said texture map data used for texture mapping operations of graphics primitives;

b) storing in a cache memory recently accessed texture map data of said texture map data of said memory unit;

c) determining if a particular texture map address is a hit address or a miss address with respect to contents of said cache memory;

d) storing a plurality of received texture map addresses in a FIFO memory and removing individual stored texture map addresses from the bottom of said FIFO memory when texture data associated therewith is supplied from said cache memory; and e) during a fetch interval, using a cache controller circuit to fetch first texture map data from said memory unit for storage into said cache memory, said first texture map data corresponding to a texture map miss address stored in a first location of said FIFO memory; and f) within said fetch interval, using said cache controller to provide second texture map data stored within said cache memory, said second texture map data corresponding to a first texture map hit address stored in a second location of said FIFO memory, said first texture map hit address received by said FIFO memory after said texture map miss address.

16. A method as described in claim 15 further comprising the step of using said cache controller to provide, within said fetch interval, third texture map data stored within said cache memory, said third texture map data corresponding to a second texture map hit address stored in a third location of said FIFO memory, said second texture map hit address received by said FIFO memory after said texture map miss address.

17. A method as described in claim 15 further comprising the step of receiving and storing texture map hit addresses into said FIFO memory during said fetch interval.

18. A method as described in claim 15 further comprising the step processing texture data supplied by said cache controller circuit using a texture filter circuit.

19. A method as described in claim 15 further comprising the step of stalling said above step d), provided a texture map miss address is received by said FIFO memory and another texture map miss address is already stored within said FIFO memory.

20. A method as described in claim 15 further comprising the step of stalling said above step d), provided a texture map miss address reaches the bottom of said FIFO memory and its corresponding texture map data is not yet supplied from said memory unit.

* * * * *